Aug. 6, 1940.　　　R. K. PEPPER ET AL　　　2,210,598
POWER CLUTCH UNIT
Filed June 11, 1938　　　2 Sheets-Sheet 1
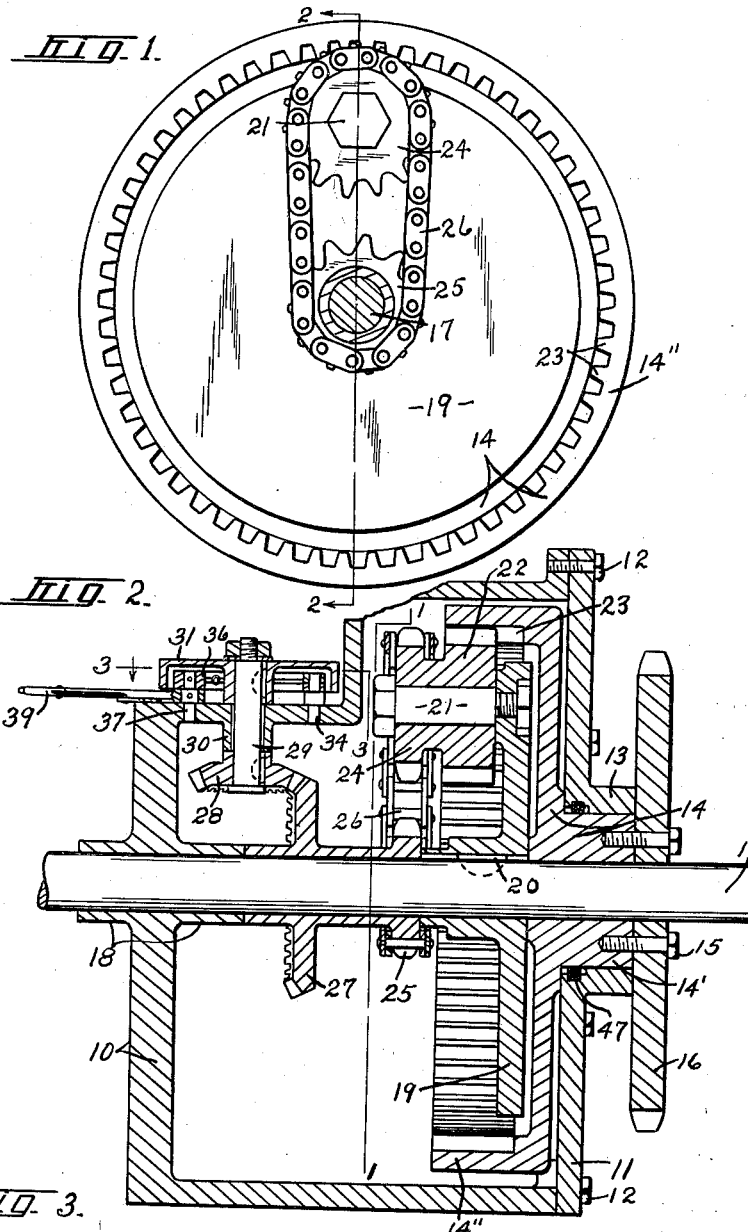
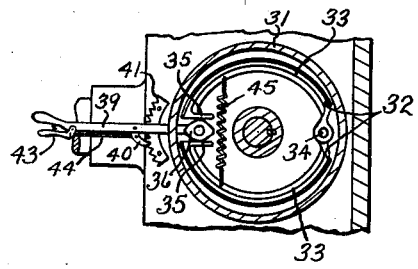
INVENTORS
ROBERT K. PEPPER
SAMUEL C. A. PEPPER
BY
Theodore L. Simonton
ATTORNEY Aug. 6, 1940.       R. K. PEPPER ET AL       2,210,598
POWER CLUTCH UNIT
Filed June 11, 1938       2 Sheets-Sheet 2
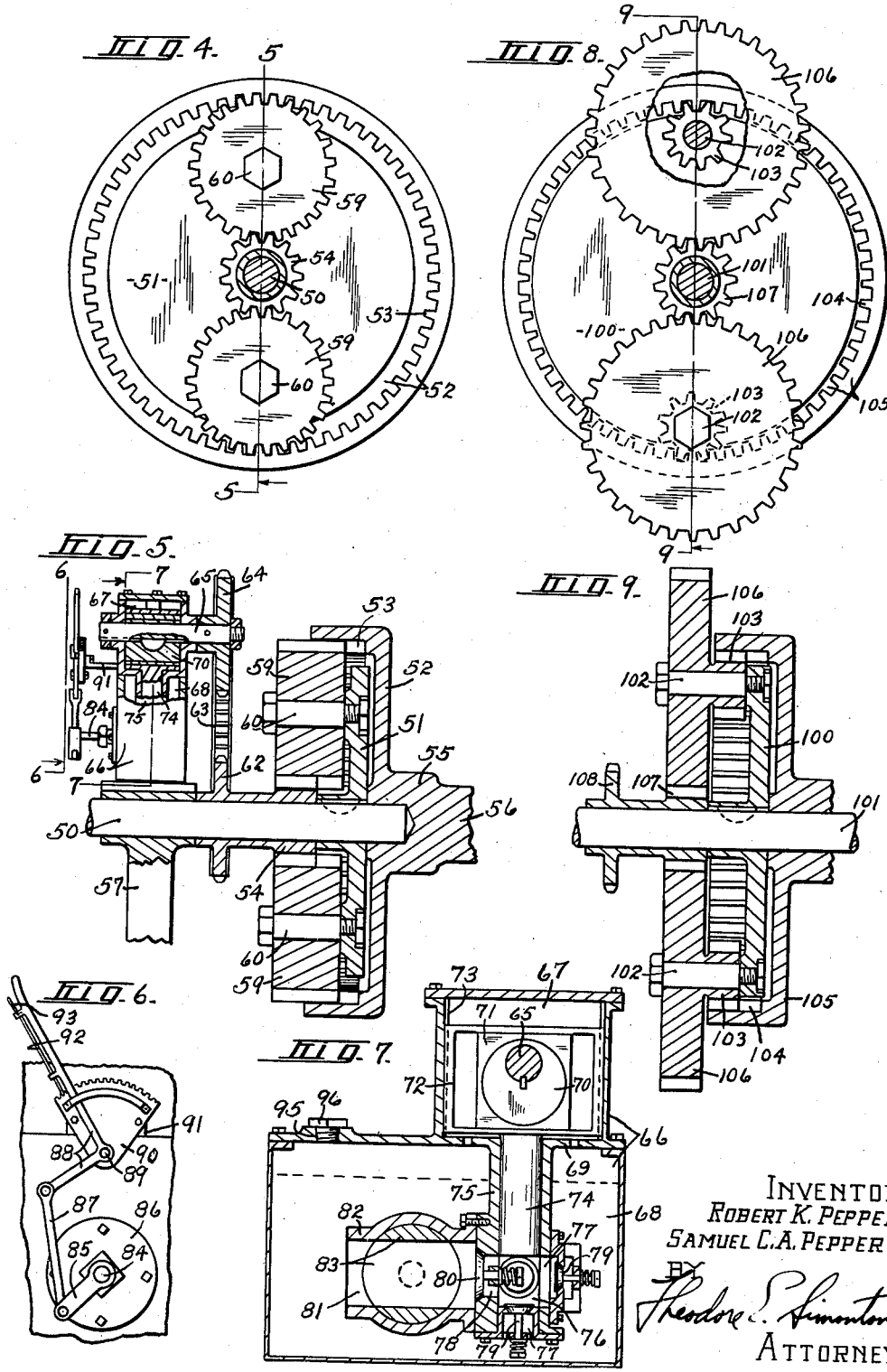
INVENTORS
ROBERT K. PEPPER
SAMUEL C. A. PEPPER
BY Theodore S. Simonton
ATTORNEY Patented Aug. 6, 1940

2,210,598

UNITED STATES PATENT OFFICE 2,210,598

POWER CLUTCH UNIT

Robert K. Pepper and Samuel C. V. Pepper, Syracuse, N. Y.

Application June 11, 1938, Serial No. 213,240

1 Claim. (Cl. 74—293)

This invention relates to improvements in a power clutch or coupling unit adapted more particularly for use in connection with heavy duty, slow speed mechanisms such as caterpillar tractors, power operated shovels, trucks or the like.

The clutch or coupling unit comprising this invention is particularly adapted to be used with mechanisms operated by an internal combustion engine or by any other suitable source of power of a similar character. Clutches used in heavy duty machinery of the above mentioned class are usually of the friction disc or the positive jaw type. Both of these types of clutches are expensive and unsatisfactory to use for this purpose due to the relatively short life of the clutch member caused by the excessive stresses to which they are subjected, and to the frequent replacement of the clutch or of parts thereof which this necessitates. These clutch members and the associated parts thereof are often, if not invariably, mounted in a housing and require much time and labor to be disassembled in order that the clutch and the drive and driven elements associated therewith may be disconnected from each other, and the clutch repaired or replaced by another clutch.

One of the main objects of this invention is to provide a clutch unit for connecting a drive member to a driven member which comprises a manually operated clutch control means adapted to be mounted in a convenient location exteriorly of a housing for the drive and driven members and a simple, durable and efficient operating means for operatively connecting the clutch control means to both the drive and driven members to be positively driven thereby and whereby the clutch control means may be repaired or replaced by another control means if necessary, without taking apart the members of the drive and driven assembly.

Another important object of this invention is to produce a clutch unit including a remote clutch control and an operating means for connecting the clutch control with the drive and driven members which functions to produce a minimum amount of lost motion between said drive and driven members when said members are connected by the clutch unit to transmit motion from one to the other.

A further object of the invention is to produce a clutch unit of the above mentioned class which may be constructed with sufficient strength to be successfully used in connection with a motor which operates at a very high or excessive degree of power and is not limited to be used in connection with any particular degree of power as is often the case with clutches now in use, particularly when said clutches are of the friction disc type.

Still another object is to provide a clutch unit having a smooth clutching action for connecting drive and driven members to each other when said members are being operated in a lubricant without decreasing the efficiency of the clutch unit.

A still further object of the invention is to provide a clutch unit of the above mentioned class which includes a clutch control means of such a character that the engagement of the clutch may be gradually effected and thus provide for slippage between the drive and driven members prior to the positive connection of said members in substantially fixed relation to each other.

Other objects and advantages pertaining to the detailed construction of the device will more fully appear from the following description taken in connection with the accompanying drawings, in which:

Figure 1 is a detail vertical sectional view taken substantially on line 1—1, Figure 2, illustrating a portion of one form of operating mechanism of a clutch unit embodying the various features of this invention for connecting the control means with the drive and driven members.

Figure 2 is a longitudinal vertical sectional view taken on line 2—2, Figure 1, with a portion of the case broken away.

Figure 3 is a detail horizontal sectional view through the manually operated clutch control means taken substantially on line 3—3, Figure 2.

Figure 4 is a vertical sectional view similar to Figure 1, illustrating a modified form of the operating mechanism shown in said Figure 1 for connecting the manually operated clutch control means with the drive and driven members.

Figure 5 is a vertical longitudinal sectional view taken on line 5—5, Figure 4, a portion of the manually operated clutch control means being illustrated in elevation.

Figure 6 is a detail side elevation of the manually operated clutch control means as viewed from line 6—6, Figure 5.

Figure 7 is a vertical sectional view taken on line 7—7, Figure 5.

Figure 8 is a sectional view similar to Figure 4, illustrating a still further modified form of the operating mechanism for connecting the manually operated control means with the drive and driven members.

Figure 9 is a detail longitudinal sectional view taken substantially on line 9—9, Figure 8.

In the structure shown in Figures 1, 2 and 3 of the drawings for the purpose of illustrating the invention, the reference character 10 designates a case or housing adapted to support a drive and driven member and one embodiment of a clutch unit comprising this invention for operatively connecting said members to each other. The case 10 is provided with a cover 11 which is secured to one end portion thereof by screws 12. The cover 11 is provided with a centrally located boss 13 which forms a bearing member for rotatably supporting a driven member 14. The driven member 14, in this instance, is in the form of a flanged disc mounted within the case 10 adjacent the cover 11. The disc 14 is provided with a centrally located hub 14' which extends outwardly through the bearing portion 13 of the cover 11 and has secured to the outer end thereof, as by screws 15, a driven element 16 which in this instance is in the form of a sprocket wheel. The hub 14' of the disc 14 is provided with a centrally located hole which rotatably receives a drive shafe 17 therethrough. This shaft 17 extends through the housing 10 and is journaled in suitable inner and outer bearing members 18 provided on the wall of the housing 10 opposite the cover 11. Mounted on the shaft 17 adjacent the inner side of the disc 14 is a drive plate 19 which is secured to the shaft 17, as by a key 20, so as to rotate in unison with said shaft.

The plate 19 is provided with a stub shaft 21 which projects inwardly therefrom in spaced substantially parallel relation with the shaft 17. Rotatably mounted on the stub shaft 21 is a pinion 22 which is in meshing engagement with internal gear teeth 23 provided on the inner peripheral surface of the annular flange 14" of the disc 14. A sprocket wheel 24 is also rotatably mounted on the stub shaft 21 adjacent the inner side of the pinion 22 and which is rigidly connected with said pinion to rotate in unison therewith.

Loosely mounted on the drive shaft 17 at the inner side of the drive or carrier plate 19 is a sprocket wheel 25 which is operatively connected with the sprocket wheel 24 by a sprocket chain 26. Rotatably mounted on the shaft 17, intermediate the sprocket wheel 25 and the inner bearing member 18 of the housing 10, is a bevel gear 27 which is fixedly secured to the sprocket wheel 25. The bevel gear 27 is in meshing engagement with a bevel gear 28 secured to the lower end of a vertically disposed stub shaft 29 which is journaled in a bearing member 30 provided on the housing 10 above the shaft 17. The shaft 29 extends outwardly through the housing 10 and has secured to the outer end portion thereof a brake drum 31 in which is encased brake band sections 32. The brake band sections 32, in this instance, are mounted on two shoes 33, each of which is rotatably connected to the housing 10 at one end thereof by a pin 34, as shown in Figures 2 and 3. The other ends of the brake shoes 33 are provided with inwardly projecting bearing flanges 35 which receive between them a cam 36 secured to the upper end of a stud 37 which is rotatably mounted in the upper portion of the housing 10 at the opposite side of the shaft 29 from pin 34.

A handle lever 39 has one end thereof fixed to the stud 37 so as to produce rotation of said stud. This lever 39 extends outwardly from the stud 37 beneath the brake drum 31 and a pawl 40 is pivotally connected to said lever intermediate the ends thereof. This pawl 40 is adapted to operatively engage a rack 41 secured to the upper wall of the housing 10, as illustrated in Figures 2 and 3. The lever 39 and cam 36 are maintained in position by means of the pawl 40 and rack 41 for maintaining the brake bands 32 in the desired pressure engagement with the drum 31. The pawl 40 may be actuated by a release lever 43 pivotally connected with the outer end of the lever 39 and which is connected with the pawl 40 by a rod 44. The free ends of the brake shoes 33 are urged inwardly toward each other for maintaining the flanges 35 in engagement with the cam 36 by means of a spring 45 connected with said shoes.

It will be noted that when the brake bands 33 are out of frictional contact with the brake drum 31, said brake drum, the shaft 29, and toothed wheels 28, 27 and 25 are free to rotate. It, therefore, follows that when the shaft 17 and the carrier disc 14 are being rotated, the toothed wheels 25, 27 and 28, the shaft 29 and brake drum 31 will be rotated by the engagement of the gear 22 with the internal gear teeth 23 on the driven plate 14 when said plate is maintained stationary by a load produced thereon through the medium of the sprocket wheel 16.

It will also be observed that when the brake bands 32 are removed into frictional engagement with the brake drum 31 by the cam 36 and lever 39, the sprocket wheel 25 will be maintained thereby against rotation so that during rotation of the shaft 17 and carrier disc 19 the driven member 14 will be rotated substantially in unison with said shaft and carrier disc due to the engagement of the gear 22 with the internal gear teeth 23. In other words, when the brake drum 31 and toothed members 27, 28 and 25 are thus held against rotation, the sprocket wheel 24 will of course be revolved about the sprocket wheel 25 by the carrier 19. This produces a relative slow rotary movement of the sprocket wheel 24 and the spur gear 22 about the axis of the stub shaft 21. The direction of rotation of the members 24 and 22 will be the opposite to the direction of rotation of the shaft 17 and carrier disc 19 so that gear 22, driving gear 23, will cause the driven members 14 and 16 to be rotated about the axis of the shaft 17 at a slightly slower speed than the speed of rotation of shaft 17 and disc 19. This rotation of the drive and driven members 17 and 14 with respect to each other is relatively slight owing to the sprocket wheel 25 being constructed with a relatively small diameter.

Furthermore, it will be understood that the shaft 17 and carrier disc 19 may be rotated without rotating said driven member at the maximum speed by manipulating the brake shoes 33 to place a greater or less degree of drag upon the toothed member 25 or resistance to the rotation thereof. It, therefore, follows that the speed of rotation of the driven members 14 and 16 may be readily controlled through the medium of the lever 39 and brake shoes 33 to produce any desired degree of rotation of the driven members from the minimum to the maximum during the operation of the shaft 17.

In the structure shown in Figure 2, the gear members contained in the case 10 may be operated while immersed in a suitable lubricant contained in the case. It is necessary that the level of the lubricant be only a short distance above the lower edge of the carrier disc 19, inasmuch as the lubricant will be carried to the upper portion of the case by the internal gear 23 and be thus deposited upon the gear members associated with the shafts 17 and 29. In order to prevent escape of the lubricant outward from the interior of case 10 between the cover 11 and hub 14' of the driven member 14, a suitable packing ring 47 may be provided in the cover 11, as shown, to engage the peripheral surface of the hub 14'.

While the shaft 17 has been described as being the driving member, it will be obvious that the disc 14 may be the driving member, in which case the shaft 17 and carrier disc 19 would be rotated at a greater rate of speed than the member 14 when the toothed wheel 25 is held against rotation by the coaction of the clutch control means which includes brake shoes 33 and brake drum 31. In other words, the driven member is rotated faster than the drive member when the clutch unit is in the clutching position due to the internal gear 23 driving the pinion 22.

In Figures 4 and 5, there is illustrated a modified form of structure in which the shaft, as 50, upon which the carrier disc, as 51, is mounted, is the driven member while the flanged disc, as 52, having internal gear 53 associated therewith, is the driving member. In this structure, the driven member or shaft 50 is rotated at a slower rate of speed than the driving member, disc 52, when the toothed member 54, loosely mounted on shaft 50, is held against rotation. Although the structure shown in Figures 4 and 5 is not illustrated as being mounted in a housing, it will be understood that this structure may be mounted in a suitable housing in the manner illustrated in Figure 2 of the drawings. In order that the drive member 52 may be rotatably mounted in a housing, said member is provided with a centrally located hub 55 adapted to be received in a suitable bearing, not shown, connected with the housing.

Associated with the outer end of the hub 55 is a shaft, as indicated at 56, of any suitable length and which may be operatively connected in any suitable manner with a source of power, not shown. In this instance, the shaft 56 is shown having one end thereof journaled in the hub portion 55 of the disc 52. The other end portion of the shaft 50 is shown extended through a suitable bearing member 57 which may be connected with a housing or other suitable support. The shaft 50 may extend beyond the bearing member 57 and be connected in any suitable manner with an element or mechanism to be operated by the shaft.

In the structure shown in Figures 4 to 7, inclusive, the carrier disc 51 mounted on shaft 50 rotatably supports a pair of spur gears 59 which are loosely mounted on corresponding stub shafts 60 secured to the carrier disc at diametrically opposite sides thereof. These gears 59 are in meshing engagement with the internal gear 53 provided on the flanged disc 52. These gears are also in meshing engagement with pinion 54 loosely mounted on the shaft 50 adjacent the inner side of the carrier disc 51. A sprocket wheel 62, fixedly connected with the pinion 54, is also loosely mounted on the shaft 50 and is operatively connected by a sprocket chain 63 with a sprocket wheel 64 carried by a horizontally disposed shaft 65 mounted in a housing 66, as shown in Figure 5.

The housing 66 may be mounted in any suitable manner, as upon the bearing member 57 as shown in Figure 5. This housing comprises an upper chamber 67 and a lower chamber 68, separated by a wall 69. The shaft 65 is arranged to extend through the upper chamber 67 and has secured thereto an eccentric 70 which is arranged to rotate within the chamber 67 between opposite side walls thereof. Journaled upon the eccentric 70 is a bearing block 71 which is mounted for sliding movement in a frame or head 72 mounted in the chamber 67. The frame or head 72 is mounted upon guideways 73 provided in the chamber 67 for vertical reciprocative movement, that is, for movement at substantially right angles to the reciprocative movement of the bearing block 71.

Connected with the lower portion of the frame 72 is a plunger 74 which extends downwardly into the chamber 68 and is mounted for vertical reciprocative movement in a cylindrical housing 75 supported by the housing wall 69. The lower end of the cylindrical housing 75 is provided with a fluid chamber 76 which is provided with a plurality of inlet openings 77 and an outlet opening 78. The inlet openings 77 are controlled by valves 79 which are arranged to open as the plunger 74 moves upwardly in a direction away from the fluid chamber 76. The outlet opening 78 is provided with a valve 80 which is adapted to be opened by pressure produced in the fluid chamber 76 by the downward movement of the plunger 74 in a direction toward said fluid chamber. The outlet 78 is in communication with a fluid passage 81 provided in a valve casing 82 secured to one side of the cylindrical housing 75.

Rotatably mounted in the casing 82 is a valve 83 for controlling the flow of fluid through the passage 81. The stem, as 84, of the valve 83 extends outwardly through the adjacent portion of the housing 66, as indicated in Figures 5 and 6, and has secured to the outer end thereof a crank arm 85.

In order to prevent leakage of fluid contained in the chamber 68 outwardly around the valve stem 84, a suitable stuffing box, as indicated at 86, may be secured to the housing 66 for receiving the stem 84 therethrough. The crank arm 85 is connected by a link 87 to an L-shaped lever 88 which is pivotally connected, as at 89, with a segmental rack member 90 which is secured in any suitable manner, as by a bracket 91, to the housing 66 over the valve stem 84.

A pawl rod 92, slidably mounted on the lever 88 and actuated by a fingerpiece 93, is adapted to cooperate with the rack 90 for maintaining the valve 83 in an adjusted position for controlling the flow of fluid through the passage 81.

In operation, the chamber 68 of the housing 66 is substantially filled wtih oil or other suitable liquid which may be deposited in said chamber through an opening 95 provided in the housing 66 that is normally maintained closed by a plug 96. When the valve 83 is in the open position, as illustrated in Figure 7, oil or other liquid may freely pass through the passage 81 so that, as the plunger 74 is reciprocated in the housing 75, liquid pumped into the chamber 76 from the chamber 68 through the inlet passages 77 upon the upward stroke of the plunger will be forced from the chamber 76 through the outlet 78 and passage 81 back into the chamber 68 upon the next downward stroke of the plunger 74.

The reciprocation of the plunger 74 is produced when the drive member 52 is being rotated, through the medium of the gears 53, 59, 54 and sprocket wheels 62 and 64 and the sprocket chain 63. When the plunger 74 is thus permitted to freely reciprocate, it will be obvious that the carrier disc 51 and shaft 50 will be held stationary by a load connected with the shaft 50, due to the gears 59 being permitted to freely rotate about the stub shafts 60. Rotations of the gears 59 will thus cause a corresponding rotation of the pinion 54 and sprocket wheel 62. When the valve 83 is moved to the closed position, liquid pumped into the chamber 76 by the upward or outward movement of the plunger 74 will be trapped in said chamber and prevent the inward or return movement of the plunger. The shaft 65 will thus be maintained against rotation which in turn will hold sprocket wheels 64 and 62 and the pinion 54 against rotation. As the pinion 54 is thus held stationary, rotation of the internal gear 53 produced by the drive member 52 will cause the gears 59 to revolve about the pinion 54 in meshing engagement therewith and thereby produce rotation of the carrier disc 51 and shaft 50 in the direction of rotation of the drive member 52.

When the pinion 54 is held against rotation and the disc 52 is the drive member, rotation of said disc will carry gears 59 and the carrier disc 51 about the axis of shaft 50. The carrier disc 51 and shaft 50 connected therewith will, however, rotate slightly slower than the drive member 52 due to the gears 59 being rotated about the stub shafts 60 by the engagement thereof with the relatively stationary pinion 54. The direction of rotation of the gears 59 produced by the pinion 54 will be the same as the direction of rotation of the drive member 52 which causes the carrier disc 51 to rotate slightly slower than the drive member 52.

If, on the other hand, the shaft 50 becomes the drive member and the disc 52 the driven member, then when the pinion 54 is held against rotation, the gears 59 will cause the driven member 52 to rotate at a slightly greater speed than the shaft 50 and carrier disc 51 due to the gears 59 driving internal gear 53 and the engagement of said gears 59 with the pinion 54.

From the foregoing description, it will be understood that in the structure shown in Figures 5, 6 and 7, the pinion 54 is hydraulically controlled and the speed of rotation of the driven member with respect to the drive member may be readily governed from the minimum to the maximum by manipulation of the valve 83. In other words, when the valve 83 is in the open position, reciprocation of the plunger 74 will draw the liquid from the chamber 68 past the valve 79 and through the inlet openings 77 into the chamber 76 and thence outwardly through the outlet opening 78 past valve 80 and be returned to the chamber 68 through the passage 81.

As the valve 83 is moved from the open position toward the closed position, the resistance to the flow of liquid through the passage 81 will be gradually increased, thereby increasing the resistance to the reciprocation of plunger 74 and producing a corresponding resistance to the rotation of pinion 54. It will thus be seen that the speed of rotation of the driven member with respect to the drive member may be readily controlled by maintaining the resistance to the rotation of pinion 54 at the required ratio to the load carried by the driven member to be moved.

In Figures 8 and 9, there is shown a still further modification of the invention. The structure shown in these figures is adapted to function in substantially the same manner as that shown in Figures 1 and 2 in that the shaft to which the carrier disc is secured is the drive member while the disc having the internal gear formed thereon is the driven member. This structure is adapted more particularly for a gear connection between the holding pinion and the internal gear carried by the driven member in lieu of the sprocket wheels and chain shown in Figures 1 and 2. In the structure shown in these two figures, the carrier disc 100 secured to the shaft 101 is provided with two stub shafts 102 arranged at diametrically opposite sides of the disc. Rotatably mounted upon the shafts 102 are pinions 103 which are in meshing engagement with the internal gear 104 provided on the flanged disc 105. Secured to the pinions 103 are relatively large spur gears 106 which are in meshing engagement with a pinion 107 rotatably mounted upon the shaft 101.

Secured to the pinion 107 is a sprocket wheel 108 which may be connected in any suitable manner, as by a sprocket chain, with a manually operated control mechanism mounted remote from the shaft 101 and sprocket wheel 108 for holding the pinion 107 against rotation. In this structure, as in the other two structures illustrated in the drawings, either the shaft 101 or the disc 105 may be the driven member while the other one of these members may be the driver. When the shaft 101 is the driven member, the driven member 105 will rotate at a slightly slower rate of speed than the shaft due to the rotation of the gears 106 about the shafts 102 produced by the pinion 107.

The pinions 107 and 103 are relatively small in diameter while the gears 106 are relatively large, thereby reducing the difference in the speeds of rotation of the drive and driven member when the pinion 107 is held against rotation to a minimum.

Although there is shown and particularly described the preferred embodiments of the invention, it is not wished to be limited to the exact constructions shown as various changes both in the form and relation of parts thereof may readily be made without departing from the spirit of the invention as set forth in the appended claim.

We claim:

In a power clutch unit having a planetary gear system which comprises a shaft and an orbit gear member rotatably mounted in substantially coaxial relation with each other, a sun gear journaled on the shaft, a planetary gear member fixed to the shaft to rotate therewith and having meshing engagement with the sun gear and with said orbit gear for transmitting rotary motion from one of said latter gears to the other gear, the combination with said planetary gear system of means for controlling rotation of the sun gear to vary the speed of the orbit gear comprising a case for containing fluid, a piston chamber in said case having valved inlet and outlet openings communicating with the interior of said case, a piston mounted in said chamber, means operatively connecting the piston with the sun gear, and manually controlled valve means associated with one of said valved passages of the piston chamber and functioning independently of the valve for said passage for controlling the flow of fluid through the piston chamber.

ROBERT K. PEPPER.
SAMUEL C. V. PEPPER.